United States Patent
Mueller et al.

(10) Patent No.: US 7,144,510 B2
(45) Date of Patent: Dec. 5, 2006

(54) METHOD AND APPARATUS FOR TREATMENT OF A FLUID STREAM

(75) Inventors: Paul Mueller, Corvallis, OR (US); Anthony G Myers, Franklin, WI (US)

(73) Assignee: CH2M Hill, Inc., Englewood, CO (US)

( * ) Notice: Subject to any disclaimer, the term of this patent is extended or adjusted under 35 U.S.C. 154(b) by 0 days.

(21) Appl. No.: 11/208,905

(22) Filed: Aug. 22, 2005

(65) Prior Publication Data

US 2005/0274674 A1  Dec. 15, 2005

Related U.S. Application Data

(63) Continuation of application No. 10/727,441, filed on Dec. 3, 2003, which is a continuation-in-part of application No. 09/991,478, filed on Nov. 9, 2001, now Pat. No. 6,783,681.

(60) Provisional application No. 60/247,124, filed on Nov. 10, 2000.

(51) Int. Cl.
*B01D 61/00* (2006.01)
*B01J 49/00* (2006.01)
*C01F 1/42* (2006.01)

(52) U.S. Cl. .................. 210/650; 210/660; 210/663; 210/670; 210/263; 210/669; 210/269

(58) Field of Classification Search ........... 210/650, 210/636, 660, 663, 651, 652, 670, 669, 638, 210/668, 263, 264, 269
See application file for complete search history.

(56) References Cited

U.S. PATENT DOCUMENTS

| | | | |
|---|---|---|---|
| 3,996,131 A | 12/1976 | Conn | |
| 4,154,675 A | 5/1979 | Jowett et al. | |
| 4,207,397 A | 6/1980 | Davis et al. | |
| 4,289,617 A * | 9/1981 | Davis | 210/109 |
| 4,329,225 A | 5/1982 | Davis et al. | |
| 4,648,976 A | 3/1987 | Chen | |
| 4,804,465 A | 2/1989 | Brown | |
| 4,806,244 A | 2/1989 | Guilhem | |
| 5,182,023 A | 1/1993 | O'Connor et al. | |
| 5,254,257 A | 10/1993 | Brigano et al. | |
| 5,364,534 A | 11/1994 | Anselme et al. | |
| 5,464,530 A | 11/1995 | Stivers | |
| 5,595,666 A | 1/1997 | Kochen et al. | |
| 5,639,377 A | 6/1997 | Banham et al. | |
| 5,728,302 A | 3/1998 | Connor et al. | |
| 5,772,891 A | 6/1998 | Yamasaki et al. | |
| 5,932,099 A | 8/1999 | Cote et al. | |
| 6,020,210 A | 2/2000 | Miltenyi | |

(Continued)

FOREIGN PATENT DOCUMENTS

AU   704376   4/1999

(Continued)

*Primary Examiner*—Ana M. Fortuna
(74) *Attorney, Agent, or Firm*—Swanson & Bratschun, LLC (57) ABSTRACT

A method for treating a fluid by providing a raw fluid to a process tank. The raw fluid may be water having varying degrees of contamination or another type of fluid. The method further consists of adding an ion exchange resin to the process tank to form a raw fluid/ion exchange resin mixture. After the fluid has been sufficiently contacted with the ion exchange resin, treated fluid is removed from the process tank through a membrane filter located within the process tank. The method is completed by regenerating the ion exchange resin within the same process tank.

6 Claims, 7 Drawing Sheets

U.S. PATENT DOCUMENTS

| | | |
|---|---|---|
| 6,027,649 A | 2/2000 | Benedek et al. |
| 6,120,688 A | 9/2000 | Daly et al. |
| 6,171,487 B1 * | 1/2001 | Rousseau et al. ........... 210/203 |
| 6,372,143 B1 | 4/2002 | Bradley |
| 6,375,848 B1 * | 4/2002 | Cote et al. ................. 210/650 |
| 6,464,881 B1 | 10/2002 | Thoraval |
| 6,613,232 B1 * | 9/2003 | Chesner et al. ............. 210/650 |
| 6,669,849 B1 | 12/2003 | Nguyen et al. |
| 6,776,913 B1 | 8/2004 | Jangbarwala |
| 6,783,681 B1 | 8/2004 | Mueller et al. |
| 6,824,685 B1 * | 11/2004 | Katsu et al. ................ 210/626 |
| 6,926,832 B1 * | 8/2005 | Collins et al. .............. 210/615 |
| 6,954,738 B1 * | 10/2005 | Wang et al. ................. 705/59 |
| 6,982,037 B1 * | 1/2006 | Horng et al. ............... 210/615 |

FOREIGN PATENT DOCUMENTS

| | | |
|---|---|---|
| AU | 705434 | 5/1999 |
| AU | 744706 | 2/2002 |
| AU | 749656 | 6/2002 |
| DE | 3938245 | 5/1991 |
| EP | 0540485 | 5/1996 |
| EP | 0605826 | 8/1997 |
| EP | 0781255 | 7/2000 |
| JP | 59049851 | 3/1984 |
| JP | 60132609 | 7/1985 |
| JP | 09047761 | 2/1997 |
| JP | 11309354 | 11/1999 |
| WO | WO96/07615 | 3/1996 |

* cited by examiner

METHOD AND APPARATUS FOR TREATMENT OF A FLUID STREAM

RELATED APPLICATION DATA

This application is a continuation of commonly assigned U.S. patent application Ser. No. 10/727,441, filed Dec. 3, 2003, entitled METHOD AND APPARATUS FOR TREATMENT OF A FLUID STREAM, which application is a continuation-in-part of commonly assigned U.S. patent application Ser. No. 09/991,478, filed Nov. 9, 2001, now U.S. Pat. No. 6,783,681, issued Aug. 31, 2004, entitled METHOD AND APPARATUS FOR TREATMENT OF DRINKING WATER, which application claims benefit of U.S. Provisional Patent Application Ser. No. 60/247,124, filed Nov. 10, 2000, entitled METHOD AND APPARATUS FOR DRINKING WATER TREATMENT; all of said applications are incorporated herein by reference in their entirety.

TECHNICAL FIELD

The present invention is directed to a method and apparatus for the treatment of a fluid stream, and more particularly to a treatment process utilizing a regeneratable ion-exchange resin in combination with an immersed membrane filter in a single process tank.

BACKGROUND ART

Treatment and purification of raw water in order to make it suitable for drinking or the treatment of an industrial fluid stream which may be water can be accomplished by a number of methods. The character of a given water stream may lend itself to the use of a particular treatment. Ion-exchange resins are used in water treatment systems in order to remove dissolved compounds, some of which are organic. Microfiltration and Ultrafiltration membranes are used to remove particulates. For a water stream that contains both these components, one treatment must be used, followed by the second. The need for two separate steps is time-consuming, requires additional equipment, and increases the overall cost of the treatment system. Accordingly, there remains a need for an improved water treatment system that can remove particulates and dissolved organic compounds and which is cost- and time-effective compared to present systems.

Benedek, U.S. Pat. No. 6,027,649, discloses the treatment of drinking water in a single reactor tank using a ZEWEED® submerged membrane filter in conjunction with a flocculent mixed in the reactor tank and maintained in suspension by use of an air bubbler. The flocculent is intended to remove organics, color, bacteria, cysts and other impurities. Use of the flocculent taught by Benedek requires maintaining pH in a range from 5–9. This may require addition of acids or bases to a raw water supply to maintain the necessary pH range. While Benedek teaches a single tank using a flocculent in combination with a membrane filter, use of the flocculent for organic removal requires subsequent disposal of the spent flocculent. Thus, not only must suitable disposal for the spent flocculent be arranged, new coagulants must be provided to the reactor tank to form the necessary flocculent. Benedek also discusses the desirability of adding activated carbon to the reactor tank for the removal of dissolved organics. However, as with the flocculent, this creates disposal problems for spent activated carbon and requires replenishment of the reactor tank with new activated carbon.

Daly, U.S. Pat. No. 6,120,688, is directed to a water purification method also utilizing a ZEWEED® membrane filter. More particularly, Daly teaches initial particulate removal using the ZEWEED® filter followed by application of reverse osmosis to the filtered water. While Daly eliminates the disposal problems associated with the flocculent and activated carbon of the Benedek patent, the Daly patent requires a two step treatment process which increases plant size and cost requirements.

The present invention is directed to overcoming one or more of the problems discussed above.

SUMMARY OF THE INVENTION

A method for treating a fluid by providing a raw fluid to a process tank. The raw fluid may be water having varying degrees of contamination or another type of fluid. The method further consists of adding an ion exchange resin to the process tank to form a raw fluid/ion exchange resin mixture. After the fluid has been sufficiently contacted with the ion exchange resin, treated fluid is removed from the process tank through a membrane filter located within the process tank. The method is completed by regenerating the ion exchange resin within the same process tank.

The method may further consist of agitating the raw water/ion exchange resin mixture sufficiently to maintain the ion exchange resin in suspension. In addition, the method may consist of reusing or recycling the regenerant through multiple regeneration steps. In addition, the regenerant may be periodically filtered to restore its regenerative properties. The ion exchange resin may be a magnetic ion exchange resin.

An alternative embodiment of the invention consists of providing raw fluid to a process tank and adding a magnetic ion exchange resin to the process tank to form a raw fluid/magnetic ion exchange resin mixture. Thereupon, treated fluid is removed from the process tank through a membrane filter located within the process tank. The method of the alternative embodiment is completed by separating the magnetic ion exchange resin from the raw fluid/magnetic ion exchange resin mixture using a magnetic separator. The magnetic ion exchange resin may be regenerated in an external column or within the process tank and, if regenerated externally, the regenerated magnetic ion exchange resin may be returned to the process tank. The regenerant may be recycled for use in multiple regeneration steps and periodically filtered to restore its regenerative properties.

Another alternative embodiment consists of providing an upflow bed containing ion exchange resin within a portion of a process tank, flowing a stream of fluid through the upflow bed, and removing treated fluid from the process tank through a membrane filter located within the process tank. This alternative embodiment of the method is completed by regenerating the ion exchange resin in the upflow bed portion of the process tank. The regenerant may be recycled for use in multiple regeneration steps and periodically filtered to restore its regenerative properties. Alternatively, the upflow bed containing the ion exchange resin may be maintained in a separate container, apart from but in fluid communication with the process tank.

Another alternative embodiment consists of a method of treating a fluid by providing raw fluid to a process tank, adding an ion exchange resin to the process tank to form a mixture, and removing treated fluid from the process tank through a membrane filter located within the process tank. This alternative method further consists of regenerating the ion exchange resin with a regenerant in a regeneration step, recycling the regenerant for use to regenerate the ion exchange resin in multiple regeneration steps, and recovering a portion of the spent regenerant by membrane separation of the regenerant and contaminants.

A further alternative embodiment is a method of regenerating an ion exchange resin consisting of removing treated fluid from a process tank while retaining a substantial portion of the ion exchange resin within the process tank, adding regenerant to the process tank, mixing the resin and the regenerant, and removing the regenerant from the process tank while retaining a portion of the ion exchange resin within the process tank. The retained resin may be rinsed within the process tank after removing the regenerant. A second, make up portion of ion exchange resin may be added to the process tank to make up for ion exchange resin lost to the system.

DETAILED DESCRIPTION OF THE PREFERRED EMBODIMENT

Figure 1:
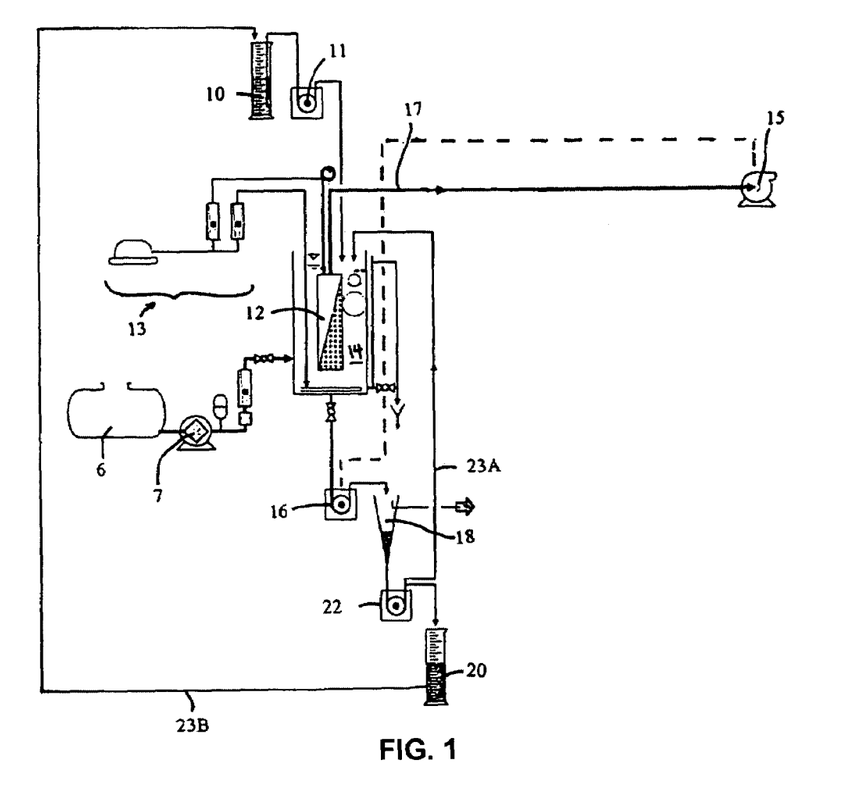
FIG. 1 is a schematic of the drinking water treatment system according to the present invention.
Figure 2:
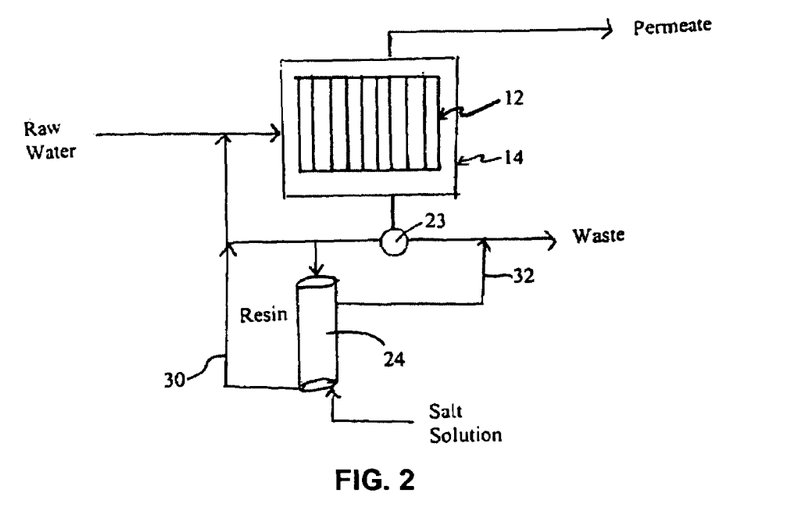
FIG. 2 is a simplified schematic of an embodiment of the present invention wherein regeneration of the resin is accomplished by a countercurrent column.
Figure 3:
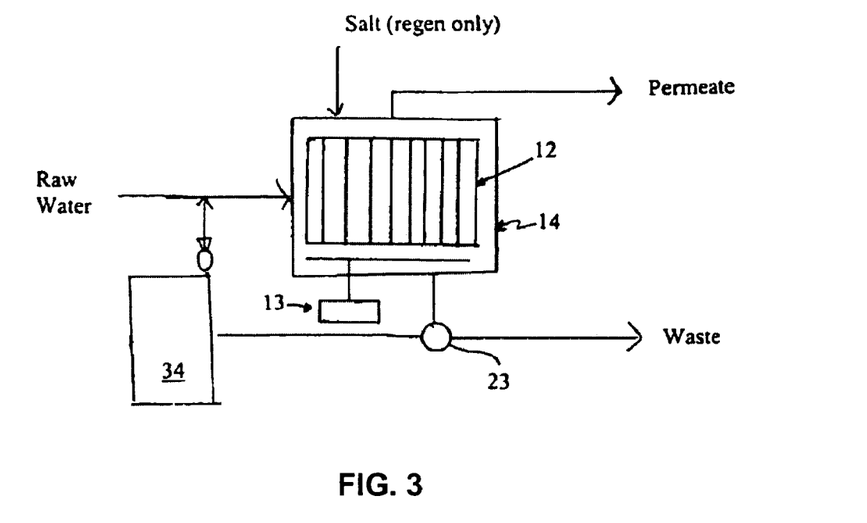
FIG. 3 is a simplified schematic of an embodiment of the present invention wherein regeneration of the resin is accomplished in the process tank.

The water or fluid stream treatment process of the present invention combines two separate technologies to remove dissolved material and particulates in a single treatment process. Schematics of this process are shown in FIGS. 1, 2, and 3. The invention will in part be described below as a method of treating drinking water, but the method is applicable to any suitable fluid stream. With reference to FIG. 1, raw water from raw water tank 6 is introduced to a process tank 14 under force of gravity or a pump 7. An adsorbent ion-exchange resin from a resin storage container 10 is added via gravity force or a pumping system 11 to the process tank 14 which contains a submerged membrane filter 12. A suitable submerged filter is the ZEEWEED® membrane (ZENON Environmental, Inc., Ontario, Canada). The ion-exchange resin removes dissolved material from the water and the membrane filter removes particulates. The tank 14 is mixed via aeration by an aeration system 13 to suspend the ion-exchange resin. Treated water is extracted through hollow fiber membranes of the membrane filter 12 using applied vacuum (outside/in) from pump 15 applied to the permeate suction header 17, at which point the treated water can be disinfected, stored, and distributed.

Ion-exchange resins have a finite capacity for adsorbing materials. When this capacity has been reached, the resin must be discarded or regenerated. A high concentration of ion-exchange resin builds up in the process tank 14 during the treatment process and can be removed via gravity, or a pump 16. The used ion-exchange resin is then conveyed to the resin separator 18, where it is extracted from the residual water. The ion-exchange resin may then be regenerated in a regeneration reservoir 20. Typically, regeneration is accomplished by treatment with a high concentration salt solution. Regenerated resin may be returned to the process tank 14 by a return pump 22 via line 23A or conveyed to resin storage container 10 via line 23B.

In a preferred embodiment, the ion-exchange resin is a magnetic ion-exchange resin, such as MIEX® DOC manufactured by Orica Watercare, Melbourne, Australia. Preferably, about 20 mL MIEX® DOC resin per liter of water is used. In this case, the resin may optionally be removed from the membrane filter tank by using a magnetic separator 23 (shown only in FIGS. 2 and 3, but which could also be part of the system shown in FIG. 1) which separates the magnetic resin from the water and other non-magnetic particles in the tank.

Referring to FIG. 2, in a further embodiment, regeneration of the resin is accomplished in a column 24 where a salt solution is pumped through the column to remove material from the resin. The regenerated resin is removed from the column and can be placed back into the process tank via line 30. Regenerant waste is disposed through line 32.

Referring to FIG. 3, in another embodiment, the membrane filter cell is isolated, regenerant is added, and mixed with air from air mixing system 13 for regeneration. At this point the solution in the tank is removed and passed through the magnetic separator 23 to a resin storage tank 34.

In all cases, regenerated resin is returned to the membrane tank influent and the waste regenerant water is disposed of appropriately.

Because the ion-exchange resin of a preferred embodiment is magnetic, it tends to clump together and settle in the process tank 14. To overcome this tendency, an air-mixing system 13 keeps the magnetic ion-exchange resin in suspension. This air-mixing system allows for significantly higher concentrations of resin in the process tank.

In order to further optimize the system, a mathematical model expressed as a mass balance on resin was developed to determine retention time and ion exchange resin concentration in the process tank using the ZEEWEED® membrane and MIEX® DOC resin. For comparison purposes, a basic treatment process using only MIEX® DOC resin and no membrane was also modeled (hereinafter "basic process"). The values applied for the basic process are shown in Table 1, the model values are shown in Table 2, and a schematic shown in FIG. 4. The basic process 40 includes a process or contact tank 42 to which raw water is added through conduit 44 and an ion-exchange resin is added from a resin feed 46. The resin feed 46 receives virgin resin from a virgin resin supply 48 and regenerated resin from a regenerator 50. A gravity separator 52 is provided to separate ion-exchange resin from the raw water following suitable retention in the process tank, with treated water being output through conduit 54. Separated ion-exchange resin is conveyed through conduit 56 to the regenerator 50 and regenerated resin is delivered to the resin feed through conduit 58.

Figure 4:
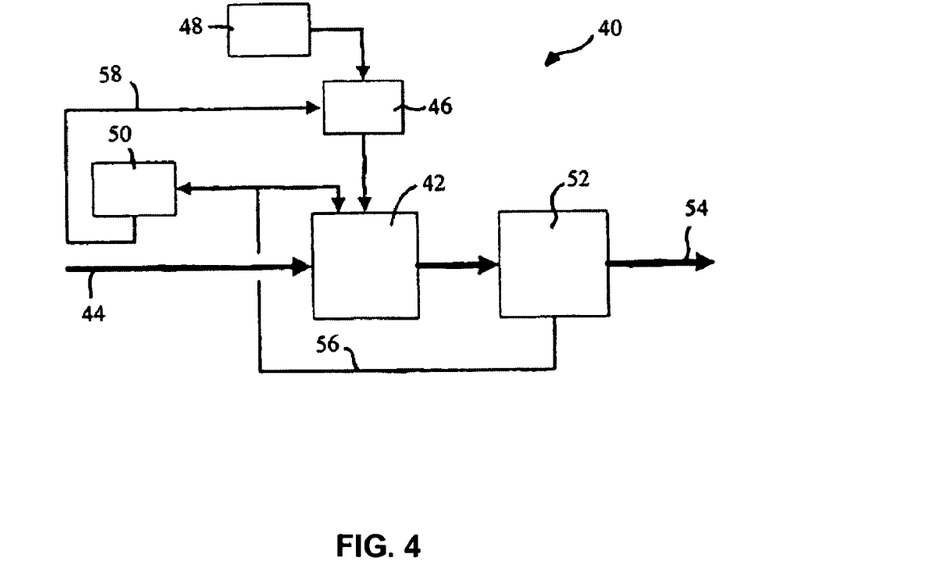
FIG. 4 is a schematic showing a basic water treatment process.

The amount of treated water, TW, per day, 1 million gallons, or 3,785,000 liters, is the same as the amount of raw water, RW, into the system, and water out of the tank, OF. The separator underflow, SU, is the amount of water leaving the separator, and is the outflow from the tank times the resin concentration, less the amount taking into account resin loss, given a 30% concentration of resin (volumetric basis), or SU=(OF*RC−OF*RC*RL)/0.3. The resin sent to regeneration, RG, is the amount of outflow times the resin concentration times the amount percent underflow to regeneration, less the amount for resin loss, or RG=OF*RC*U−OF*RC*U*RL. Recycled resin, RR, goes from the separator back to the contact tank and is the outflow times the resin concentration less the amount for resin loss, less the amount sent to regeneration, or RR=OF*RC−OF*RC*RL−RG. The amount of regenerated resin that goes back into the resin feed is equal to the amount of recycled resin. Fresh resin fed into the tank is a combination of virgin resin and regenerated resin. Fresh resin, FR, corresponds to the amount of resin that must be added to compensate for the amount of resin in stages other than the process tank, or FR=OF*RC−RR. Virgin resin, VR, corresponds to the total amount of resin that must be added to compensate for resin loss, or VR=OF*RL.

Resin Contact Time at Regeneration, $CT_R$, is the concentrate times resin concentration, taking into account the resin loss and the to underflow sent to regeneration or $RC_R$=RI/[OF*RC−OF*RC*(1−RL)*U]. Resin Inventory in Contact Tank, RI, is amount of treated water in the contact tank times the contact time, CT, times the resin retention time, or RI=RW*CT*RT. Bed Volumes Treated at Regeneration, BV, is the resin contact time at regeneration times the amount of raw water divided by the resin inventory in the contact tank, or BV=$RC_R$*RW/RI. Resin Retention Time, RT, is the resin inventory in the contact tank divided by the product of the outflow, resin loss, and resin concentration, or RT=RI/(OF*RL*RC).

TABLE 1

Values used in model of basic process.

| Variable | Designation | Value |
|---|---|---|
| Contactor Resin Concentration | RC | 6 mL/L |
| Contact Time | CT | 30 minutes |
| % Underflow to Regeneration | U | 10% |
| Resin Loss at Separator | RL | 0.10% |
| Process Flow | OF, RW, TW | 1 million gallons/day |

TABLE 2

Model of basic process.

| | Flow Stream | Flow L/day | Resin Concentration % v/v | Daily Resin @ 100% L/day |
|---|---|---|---|---|
| 1 | Raw Water | 3,785,000 | 0 | 0 |
| 2 | Resin Feed | 2,291 | 100 | 2,291 |
| 3 | Contact Tank Outflow | 3,785,000 | 0.60 | 22,710 |
| 4 | Separator Underflow | 75,624 | 30 | 22,687 |
| 5 | Treated Water | 3,785,000 | 0.0006 | 23 |
| 6 | Resin to Regen | 2,269 | 100 | 2,269 |
| 7 | Recycle Resin | 20,419 | 100 | 20,419 |
| 8 | Regenerated Resin | 20,419 | 100 | 20,419 |
| 9 | Virgin Resin | 23 | 100 | 23 |

The model using the values in Table 3 was applied to the process of the present invention using a membrane and magnetic ion-exchange resin (hereinafter membrane/resin process). The model values are shown in Table 4, and a schematic is shown FIG. 5. Briefly, schematic 5A illustrates a membrane process tank 62 including a membrane filter 63. Raw water enters the membrane process tank through conduit 64 where it is mixed with resin from resin feed 66. Water drawn through the membrane filter 63 exits as treated water at conduit 68. An ion-exchange resin/raw water mixture is drawn from the membrane process tank through conduit 70 to resin separator 72. Waste water is removed at conduit 74 for suitable disposal. The separated resin is conveyed through conduit 76 to the regenerator 78 for regeneration. Regenerated resin is conveyed through conduit 80 to the resin feed 66 where it may be mixed or supplemented with virgin resin from the virgin resin supply 82.

Figure 5:
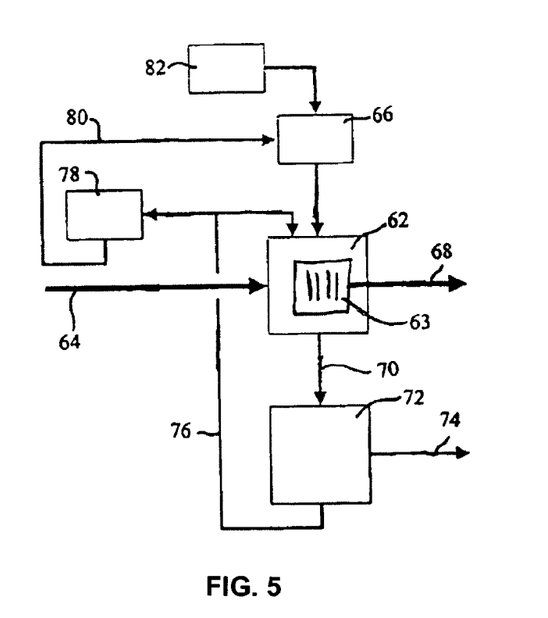
FIG. 5 is a schematic showing the membrane/resin process of the present invention.

The model is based on a treated water flow TW of 1 million gallons per day or 3,785,000 L/day. Concentrate flows from the process tank to the resin separator. Concentrate is defined as the amount the treated water times the amount lost through the membrane recovery, MR, or, C=TW*(1−MR). Raw water into the tank is 3,785,000 L/day plus the amount of concentrate C that is recycled. Treated concentrate, TC is removed from the system and is the amount of resin lost from the concentrate, or TC=C*RC*RL. Separator underflow is the water leaving the resin separator. Separator underflow SU is the concentrate sent to the resin separator times the resin concentration, taking into account the amount of resin lost, and given a 30% volume/volume concentration of resin, or SU=[C*RC*(1−RL)]/0.3. The separator underflow is split into two parts, the resin to regeneration, RG, and the resin recycled to the process tank, RR. RG is the resin in the concentrate, accounting for resin loss and the underflow sent to regeneration, U, or RG=C*RC*(1−RL)*U. Recycled resin RR is the separator underflow less the resin to regeneration, or RR=C*RC*(1−RL)−(C*RC*U)]−RG. Regenerated resin sent to resin feed is the same as resin to regeneration, RG. Fresh resin fed into the tank is a combination of virgin resin and regenerated resin. Fresh resin, FR, corresponds to the amount of resin that must be added to compensate for the amount of resin in stages other than the process tank, or FR=C*RC−RR. The amount of virgin resin in, VR, corresponds to the total amount of resin in stages of the process other than the process tank less the amount regenerated resin, or VR=FR−RG. Resin Contact Time at Regeneration, $CT_R$, is the resin inventory in the contact tank divided by concentrate times resin concentration, taking into account the resin loss and the underflow sent to regeneration or $RC_R=RI/[C*RC*(1-RL)*U]$. Resin Inventory in Contact Tank, RI, is amount of raw water in the contact tank times the contact time, CT, times the resin retention time, or $RI=RW*CT*RT$. Bed Volumes Treated at Regeneration, BV, is the resin contact time at regeneration times the amount of treated water divided by the resin inventory in the contact tank, or $BV=CT_R*TW/RI$. Resin Retention Time, RT, is the resin inventory in the contact tank divided by the treated concentrate, or $RT=RI/TC$.

TABLE 3

Values used in membrane/resin process.

| Variable | Designation | Value |
|---|---|---|
| Process Tank Resin Concentration | RC | 25 mL/L |
| Contact Time | CT | 12 min. |
| % underflow to regeneration | U | 40% |
| Resin Loss | RL | 0.10% |
| Membrane Process Recovery | MR | 95% |
| Treated Water Flow | TW | 1 million gallons/day |

TABLE 4

Model of membrane/resin process.

| | Flow Stream | Flow (L/day) | Resin Concentration (% v/v) | Daily Resin @ 100% (L/day) |
|---|---|---|---|---|
| 1 | Raw Water | 3,974,250 | 0 | 0 |
| 2 | Resin Feed | 1,895 | 100 | 1,895 |
| 3 | Concentrate | 189,250 | 2.5 | 4,731 |
| 4 | Separator Underflow | 15,755 | 30 | 4,727 |
| 5 | Treated Water | 3,785,000 | 0 | 0 |
| 6 | Resin to Regen | 1,891 | 100 | 1,891 |
| 7 | Recycle Resin | 2,836 | 100 | 2,836 |
| 8 | Regenerated Resin | 1,891 | 100 | 1,891 |
| 9 | Virgin Resin | 5 | 100 | 5 |
| 10 | Treated Concentrate | 5 | 100 | 5 |

A comparison of the results of the two processes in Table 5 indicates the improvements of the process of the present invention.

TABLE 5

Comparison of results from basic and membrane/resin process.

| Variable | Designation | Basic Process | Membrane/ Resin Process |
|---|---|---|---|
| Resin Contact Time at Regeneration (hrs) | $CT_R$ | 5 | 10.5 |
| Bed Volumes Treated at Regeneration | BV | 1,668 | 2,002 |
| Resin Inventory in Contact Tank (L) | RI | 473 | 828 |
| Resin Retention Time (days) | RT | 21 | 175 |
| Fresh Resin Dose (mL/L) | FR | 0.61 | 0.50 |
| Virgin Resin Dose (mL/L) | VR | 0.0060 | 0.0012 |

The resin contact time at Regeneration is increased from 5 hrs to 10.5 hrs. The number of bed volumes treated at the regeneration step is also increased from 1,668 to 2,002. The resin inventory in contact tank is greatly increased from 473 L to 828 L. Because the design of the system allows the resin to be recycled multiple times, the contact time for the resin will be significantly higher than the hydraulic residence time, HRT—the amount of time that water being treated resides in the treatment system. Resin retention time is also greatly increased from 21 days to 175 days. At the same time, the amount of fresh resin dose is decreased from 0.61 mL/L to 0.50 mL/L, and the amount of virgin resin dose is also decreased from 0.0060 mL/L to 0.0012 mL/L.

Figure 6A:
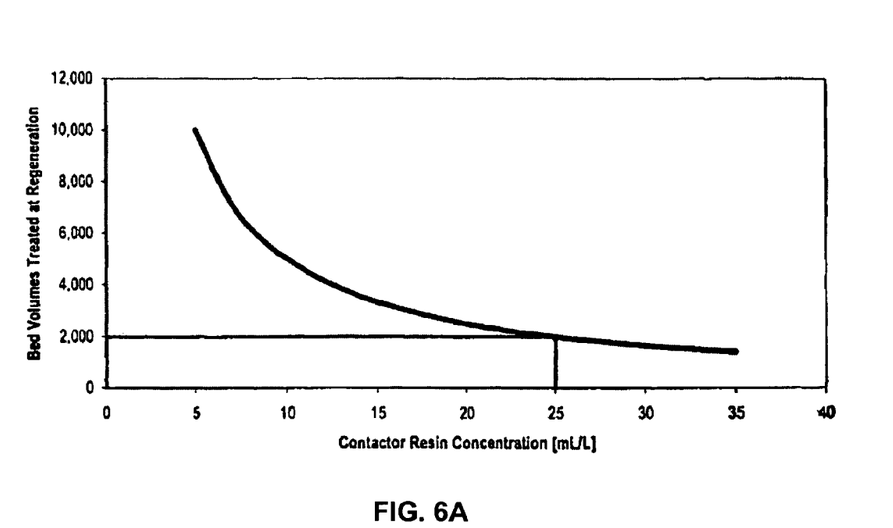
FIG. 6A is a graph showing the Effect of Controlling the Contactor Resin Concentration on the Bed Volumes Treated at Regeneration, applying a mathematical model to the proposed process as depicted in FIG. 1.
Figure 6B:
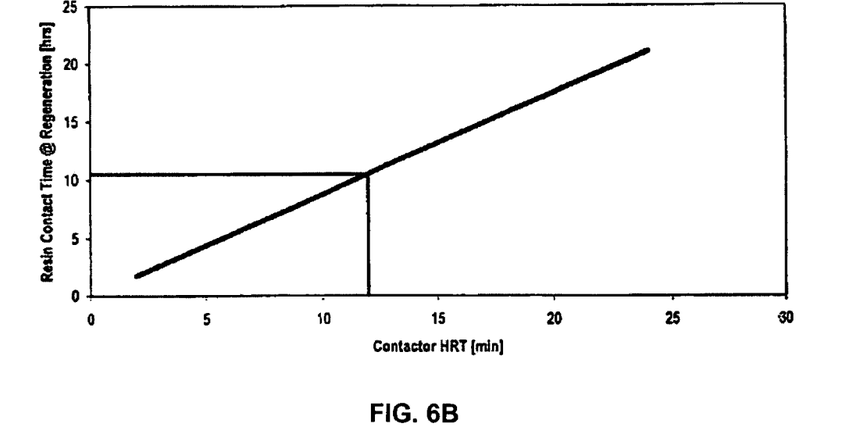
FIG. 6B is a graph showing the Effect of Controlling the Contactor Hydraulic Residence Time on the resin contact Time at Regeneration, applying the mathematical model to the proposed process as depicted in FIG. 1.
Figure 6C:
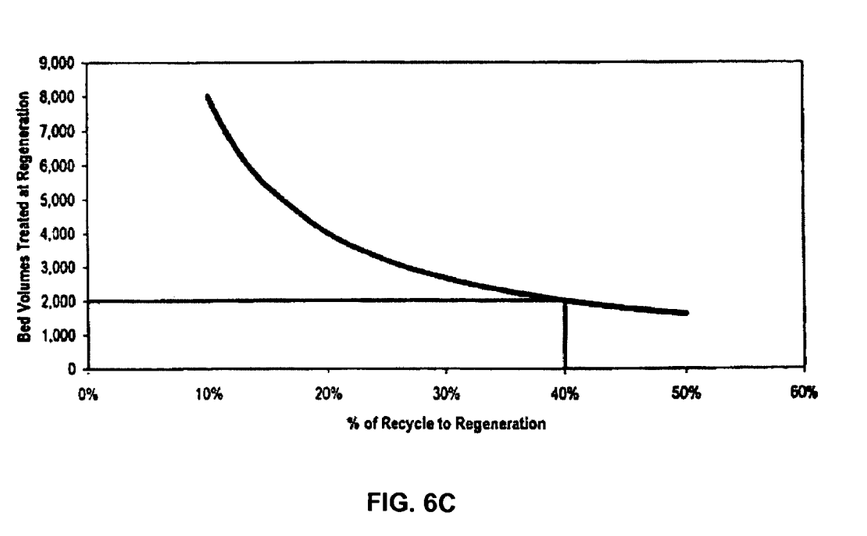
FIG. 6C is a graph showing the Effect of Controlling Resin Recycle on the Bed Volumes Treated at Regeneration, applying the mathematical model to the proposed process as depicted in FIG. 1.

The outputs of the membrane/resin process model, when inputs are varied, are also depicted in FIGS. 6A, 6B, and 6C. FIG. 6A shows the effect of controlling the contactor resin concentration on the bed volumes treated at regeneration. FIG. 6B is a graph showing the effect of controlling the contactor HRT on the resin contact time at regeneration. FIG. 6C is a graph showing the effect of controlling resin recycle on the bed volumes treated at regeneration.

Figure 7:
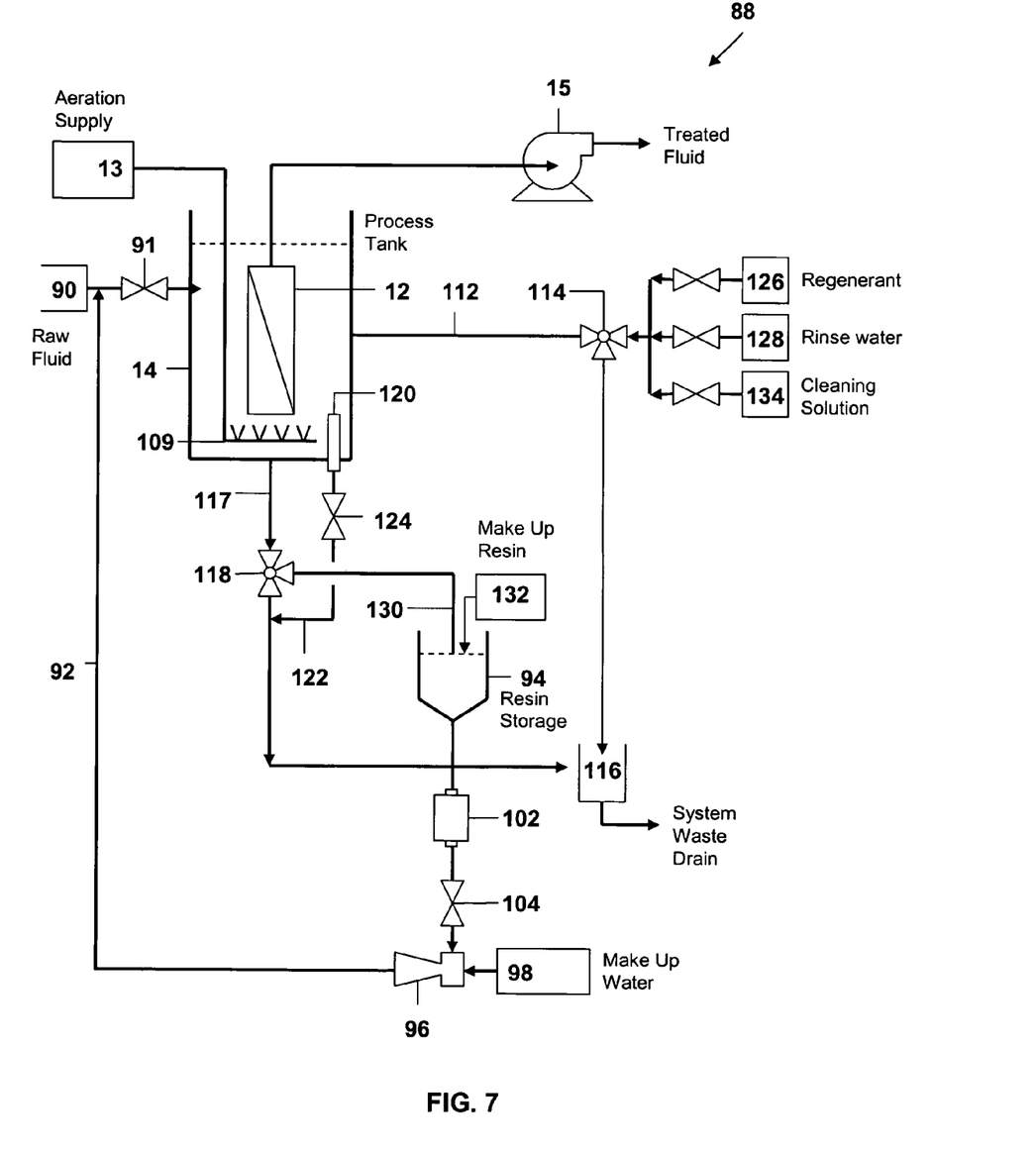
FIG. 7 is a schematic of a fully realized water treatment system according to the present invention.

FIG. 7 is a schematic representation of a fluid treatment system 88 which incorporates additional features which allow the efficient regeneration of the fluid treatment resin and efficient cleaning of the membrane 12. With reference to FIG. 7, a raw fluid which may be raw water enters a process tank 14 through fluid inlet 90 and inlet valve 91. A mixture of fresh and/or regenerated ion exchange resin or other adsorbent is added to the raw fluid in the process tank 14 through resin input line 92. The resin or adsorbent is added from a resin storage tank 94 by an eductor 96 operating using a source of make up water 98. The resin/adsorbent is supplied to the eductor 96 at a rate measured with a flow meter 102 and controlled by an isolation valve 104.

During the fluid treatment process, the process tank 14 is aerated from an aeration system 13 using diffused air bubbled through a diffuser 109 at the bottom of the process tank 14 to keep the resin/adsorbent suspended.

A membrane filter 12 driven by a filtrate pump 15 extracts treated fluid from the process tank 14. Treated fluid from this step can be disinfected and, if the fluid is water, used for drinking or other purposes. If the fluid is not drinking water, the fluid can be used in an industrial process. When employed with any fluid, the membrane 12 filters particles from the fluid and the resin adsorbent removes dissolved material. Although not shown in FIG. 7, a number of process tanks 14 can be operated in parallel for continuous production of treated fluid during a regeneration, cleaning, and maintenance cycle as described below.

When treatment has progressed to the point where the ion exchange resin or adsorbent reaches its capacity for removal, regeneration may be accomplished efficiently as follows. The process tank inlet valve 91 is closed, stopping the input of raw fluid to the process tank 14. Aeration from the aeration system 13 through the diffuser 109 is stopped. Cessation of aeration allows the resin in the process tank 14 to settle to the bottom of the process tank 14. After suspended resin has settled, water above the settled resin is removed through the decant line 112 through a 3-way valve 114 to the process drain 116. The remaining water is removed through a strainer 120 and strainer line 122 by opening a strainer valve 124. Preferably, the strainer 120 has sieve openings sized to retain the resin, but allow water and particulate matter rejected by the membrane filter 12 to pass to the process drain 116. After draining, the strainer valve 124 is closed. The resin retained by the strainer 120 remains in the process tank 14 for regeneration. Regenerant solution, which typically is a concentrated brine solution, is directed from a regenerant solution supply 126 into the process tank 14. Air from the aeration supply 13 can be used to mix the resin with the regenerant. Upon completion of the regeneration process, the strainer valve 124 is opened, and used regenerant is discharged through the strainer line 122 to the process drain 116. Thereupon, rinse water from a rinse water supply 128 enters the process tank 14 for rinsing purposes.

Air from the aeration supply 13 can be used to mix regenerated resin with rinse water. Upon completion of the rinsing process, the strainer valve 124 is opened and waste rinse water is discharged to the process drain 116. Regenerated resin retained by the strainer 120 will remain in the process tank 14 for use in subsequent fluid treatment cycles.

Although a substantial portion of the resin will remain in the process tank 14 for use in subsequent treatment cycles, some resin will break down or otherwise be lost to the system. Make up resin can be supplied to the system 88 from the resin storage tank 94. The resin storage tank 94 combines regenerated resin withdrawn from the process tank 14 with fresh resin from a fresh resin supply 132 to make up for resin lost to the system. Make up resin can then be added to the process tank 14 through the eductor 96. A fluid treatment cycle subsequent to regeneration and cleaning commences when the eductor 96 water flow is started to induce additional resin to the raw fluid supply and the inlet valve 91 is opened.

Periodically, the membrane filter 12 must be cleaned. The water treatment apparatus 88 provides for cleaning of the membrane filter 12 in place. The membrane cleaning process is commenced by closing the process tank inlet valve 91. This stops the production of filtered fluid. In addition, aeration from the aeration supply 13 is stopped. The resin is allowed to settle in the process tank 14. Water above the settled resin is removed through the decant line 112 through a 3-way valve 114 to the process drain 116. Water remaining after decanting is removed through the strainer 120 and strainer line 122 by opening the strainer valve 124. After draining, the strainer valve 124 is closed. Resin is removed from the process tank 14 by opening the 3-way resin valve 118 and directing the resin to the resin storage tank 94 through the resin line 130. Next, cleaning solution from a cleaning solution supply 134 is directed to the process tank 14. Air from the aeration supply 13 can be used to better contact the cleaning solution with the membrane 12. After sufficient contact time has expired for the cleaning of the membrane 12, the waste cleaning solution is drained from the process tank 14 through the resin line 117 and resin valve 118 and directed to the process drain 116. Upon draining of the cleaning solution, the resin valve 118 is closed and rinse water from the rinse water supply 128 enters the process tank 14. Again, air can be used to better contact rinse water with the membrane 12. Waste rinse water exits the process tank 14 through the resin line 117 and the resin valve 118. Waste water is ultimately directed to the process drain 116.

The fluid treatment apparatus 88 is particularly well suited to a batch processing system where an individual process tank 14 is either engaged in fluid treatment, resin regeneration, or a membrane cleaning step. The use of multiple processing tanks 14 connected to the fluid supply in parallel will allow for continuous fluid production.

Additional apparatus can be added to the fluid treatment apparatus 88 to accomplish the additional steps of regenerant recycling and the recovery of spent regenerant for use in future generations. A regenerant recycling and recovery apparatus 140 is shown schematically in FIG. 8. The regenerant recycling and recovery apparatus 140 is an embodiment which can be employed as an alternative to draining used regenerant through the process drain 116 and out of the system.

Figure 8:
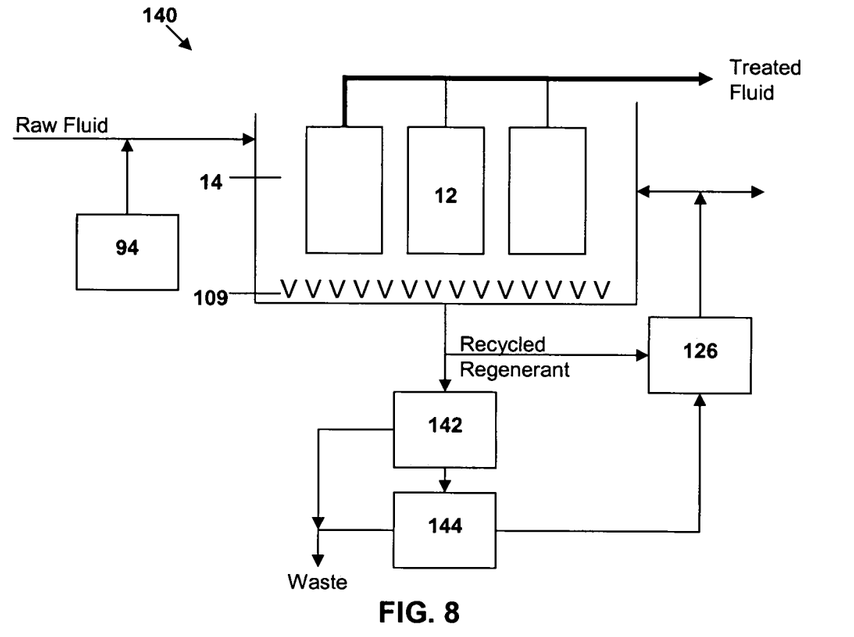
FIG. 8 is a simplified schematic of an embodiment of the present invention wherein regenerant is recycled and recovered.

The regenerant is typically a strong brine solution which is stored in a regenerant supply 126. Regenerant may be recycled from a regeneration step in the process tank 14 to the regenerant supply 126 several times over several regeneration steps without losing its effectiveness. Periodically, however, the regenerant will become contaminated to the point where it no longer effectively regenerates spent ion exchange resin. Spent regenerant can be recovered in a regenerant recycling/recovery apparatus 140 which preferably features a microscreen pre-filtration module 142 which removes larger particulate contaminants associated with the regenerant followed by a nanofiltration membrane 144 which removes smaller particulate and dissolved contaminants associated with the spent regenerant. Other filtration methods may be employed. Recovered regenerant may then be returned to the regenerant supply 126 resulting in significantly less material waste and more efficient operation.

Figure 9:
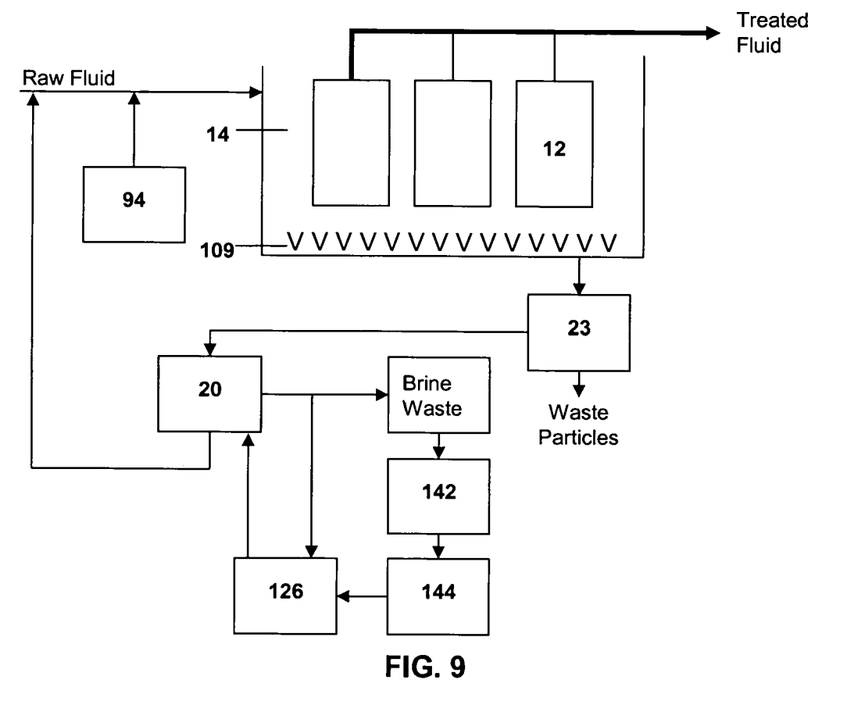
FIG. 9 is a simplified schematic of an embodiment of the present invention suitable for continuous operation where magnetic ion exchange resin is used with regenerant recycling and recovery.

The fluid treatment, regeneration, membrane cleaning, and regenerant recycling and recovery steps described above are typically performed as batch processes. An alternative embodiment shown schematically in FIG. 9 includes the use of magnetic ion exchange resin and a magnetic separator 23 which allows the fluid treatment system to be run continuously. In the embodiment depicted in FIG. 9, magnetic resin is extracted from the process tank 14 continuously by a magnetic separator 23. The removed magnetic resin is passed to a regeneration reservoir 20 where regeneration takes place. Preferably, the brine or other regenerant used to accomplish regeneration is recycled from the regenerant storage 126 to the regeneration reservoir 20 on a continuous basis. Periodically, the regenerant will become contaminated to such a degree that it is no longer useful for ion exchange resin regeneration. As shown in FIG. 9, the spent regenerant may be recovered by passing the spent regenerant through a microscreen filtration unit 142 to remove larger particles of contaminant associated with the regenerant followed by passing the regenerant through a nanofiltration membrane 144 to remove smaller particulate or dissolved contaminants associated with the regenerant. Thereafter, the regenerant can be returned to the regenerant storage 126 for reuse in the continuous system.

Figure 10:
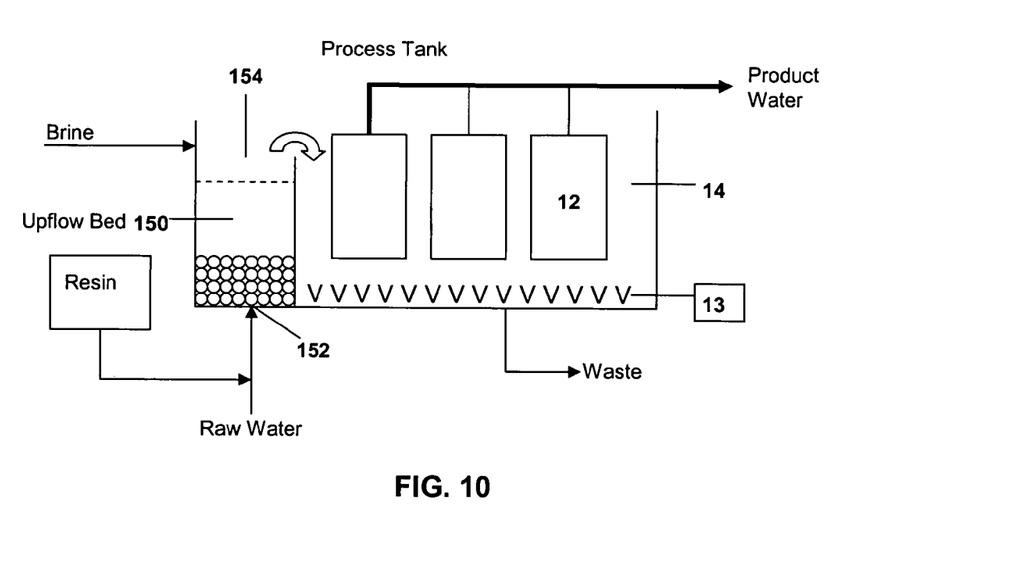
FIG. 10 is a simplified schematic of an embodiment of the present invention showing an upflow bed within a chamber of the process tank.
Figure 11:
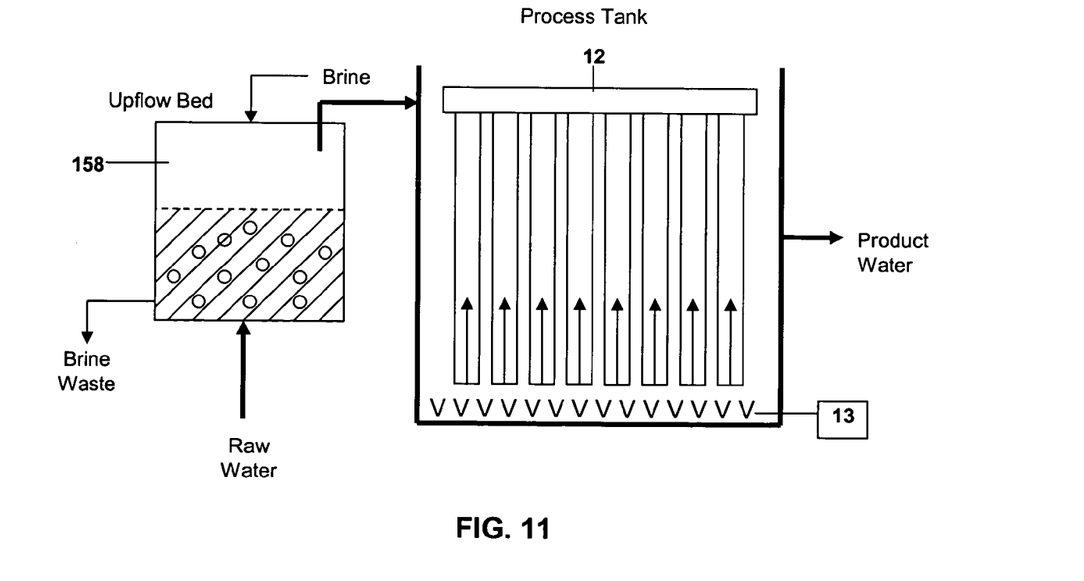
FIG. 11 is a simplified schematic of an embodiment of the present invention showing a separate upflow bed.

The embodiments of Applicant's invention described in detail above are based upon processes where the ion exchange resin is associated with and intimately contacted with the fluid being treated by means of aeration based mixing. Alternatively, as shown in FIG. 10, the fluid being treated may be contacted with the ion exchange resin by means of an upflow bed 150. The upflow bed can consist of a separate compartment or compartments in the process tank 14 where ion exchange resin is placed and contained. Fluid to be treated is fed into the process tank 14 at the inlet 152 which is located at the bottom of the upflow bed 150. Fluid being treated flows upward through the resin until the fluid emerges from an outlet 154 which is located at or near the top of the upflow bed 150. As shown in FIG. 10, the upflow filter bed can be a separate chamber or chambers defined by a divider or dividers 156 in the process tank 14. Multiple ion exchange resin chambers around a single membrane tank provides more continuous operation because one ion exchange chamber can be regenerated while the other chambers are treating raw water. As shown in FIG. 11, the upflow bed can be a discrete chamber 158. In either embodiment, an aeration supply 13 is typically provided in the process tank under the membrane filter 12 to aid with periodic cleaning of the membrane filter 12.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

What is claimed is:

1. A method for treating a fluid comprising:
   a) providing an up-flow bed containing an ion-exchange resin within a portion of a process tank;
   b) removing dissolved contaminants from the fluid by flowing a stream of the fluid through the up-flow bed;
   c) removing particulate contaminants from the fluid by removing treated fluid from the process tank through a membrane filter, wherein said process tank contains said membrane filter; and
   d) regenerating the ion-exchange resin in the up-flow bed portion of the process tank.

2. The method of claim 1 further comprising reusing a regenerant in multiple regeneration steps.

3. The method of claim 2 further comprising filtering the regenerant to restore its regenerative properties.

4. A method for treating a fluid comprising:
   a) providing an up-flow bed containing an ion-exchange resin with an outlet of the up-flow bed being in fluid communication with a process tank;
   b) removing dissolved contaminants from the fluid by flowing the fluid through the up-flow bed, out of the outlet and into the process tank;
   c) removing particulate contaminants from the fluid by passing the up-flow bed treated fluid through a membrane filter, wherein said process tank contains said membrane filter; and
   d) regenerating the ion-exchange resin in the up-flow bed.

5. The method of claim 4 further comprising reusing a regenerant in multiple regeneration steps.

6. The method of claim 5 further comprising filtering the regenerant to restore its regenerative properties.

* * * * *